United States Patent [19]

Zammit

[11] Patent Number: 5,590,590
[45] Date of Patent: Jan. 7, 1997

[54] IMPLEMENT FOR SEPARATING THE LIQUID MEDIUM FROM THE SOLID CONTENTS OF CANNED FOODSTUFFS

[75] Inventor: Edward Zammit, 40 Jefferson St., Apt. 7E, Hackensack, N.J. 07601

[73] Assignee: Edward Zammit, Hackensack, N.J.

[21] Appl. No.: 606,062

[22] Filed: Feb. 23, 1996

[51] Int. Cl.$^6$ ............... A47J 19/06; B30B 7/00; B30B 9/04; B30B 9/06
[52] U.S. Cl. ............... 99/495; 99/506; 100/110; 100/116; 100/234
[58] Field of Search ............... 99/495, 506–508, 99/644; 100/37, 110, 116, 132, 134, 135, 233, 266, 295, 283; 141/121–124; 414/419; 294/16, 118; D7/619, 686, 668, 666; D8/52

[56] References Cited

U.S. PATENT DOCUMENTS

| | | | |
|---|---|---|---|
| 3,995,544 | 12/1976 | Farley | 100/116 |
| 4,355,574 | 10/1982 | Bond et al. | 100/234 |
| 4,860,647 | 8/1989 | Kerslake | 100/234 |
| 5,335,591 | 8/1994 | Pozar | 99/287 X |
| 5,373,969 | 12/1994 | McDonald | 99/495 X |
| 5,396,838 | 3/1995 | Casapulla | 99/495 X |
| 5,461,969 | 10/1995 | Cretsinger | 99/506 |

*Primary Examiner*—Timothy F. Simone
*Attorney, Agent, or Firm*—Klauber & Jackson

[57] ABSTRACT

An implement for separating the liquid medium from the solid contents of canned foodstuffs, e.g., canned tunafish, having two arms pivotally connected by a hinge, e.g., a pivot pin, one arm ending in a compression plate and the other arm ending in a can receptacle, one or both arms being bent to allow substantial alignment of the compression plate and can receptacle, is described. The opposite ends of both arms are handles; and the compression plate is sized so as to fit into the can containing foodstuffs and allow liquid to escape therefrom when the contents are compressed. The thickness of the compression plate is also sized so that a portion protrudes from the top of the can after the contents thereof have been compressed, so that it can be used to strike a solid surface, generating a further compressive force.

11 Claims, 2 Drawing Sheets

IMPLEMENT FOR SEPARATING THE LIQUID MEDIUM FROM THE SOLID CONTENTS OF CANNED FOODSTUFFS

FIELD OF THE INVENTION

The present invention is in the field of devices for draining the liquid medium from the contents of canned foodstuffs, and particularly simple and efficient implements of this type which are manually operated and can press and squeeze the contents of the can and thereby separate the liquid medium from the solid foodstuff content of the can. The object of such devices is to accomplish this draining and separation process without the necessity of manual intervention, i.e., without the hands of the operator coming into contact with either the liquid or the foodstuff in the can. Such devices typically take as their starting point such a can which has been opened, but in which the metal lid, although separated from the remainder of the can, remains loosely in place on top of the contents of the can.

BACKGROUND OF THE INVENTION

A large assortment of foodstuffs still continue to be preserved in the traditional canning process in which such foodstuffs are processed so as to remove any bacterial content therefrom, and are then hermetically sealed in the can container. The foodstuffs involved are almost always packed in a liquid medium, usually water or oil, which are employed to prevent unwanted desiccation of the foodstuff, to serve as a buffer or cushion for the foodstuff during shipping and handling of the sealed cans, and as a difficult-to-remove remnant of the canning process.

While many foodstuffs, i.e., fruits, vegetables and meats of all kinds are put up in cans, one type which has long caused special concern are the meats, because the packing or residue liquid involved is an oil or fat, or is an oil- or fat-based composition. Not only is such a liquid undesirable when it gets on the hands of the person who is attempting to remove the contents of the can, but there will be dissolved in that oil or fat, or oil- or fat-based composition, proteins and other organic contents from the meat which not only have a disagreeable odor in most cases, but add to the undesirable feel of the liquid on the hands of the person involved. Moreover, these substances are often very difficult to remove altogether, even with repeated scrubbing with soap and water. This is particularly the case with seafood, e.g., oysters, mussels, clams, shrimp, scallops, tunafish, salmon and white fish of various kinds.

Cans used in canning foodstuffs are made of all sorts of materials and in a variety of shapes. However, steel and aluminum, and composite materials utilizing steel and aluminum, are the predominant materials used to make cans, although rigid synthetic resins are becoming more common. These cans are formed with a cylindrical sidewall, and a circular top and bottom joined to the sidewall by seams. An example of a typical can used for these purposes is that in which chunk or flake tuna is packed, usually in water. Such a can is about 9 cm in diameter, and about 6 cm tall.

While aluminum cans have tops or lids which can be removed by hand, i.e., without having to use an implement of some kind, steel cans almost invariably require the use of such an implement, the most common of which is the ordinary can opener. Such devices, whether power assisted or not, usually perforate and cut the top of the can by shearing it between two sharp wheels or rollers, which shear the periphery of the can, i.e., the circumference of the can lid, as they move together around it. As a result of this action, there is a sufficient opening between the wall of the can and the edge of the lid to permit draining of the liquid medium in the can by simply inverting the can, while the lid maintains the solid contents of the can in place. Indeed, if the lid has been totally freed from the can wall, it can be used to compress or squeeze the solid contents of the can so as to remove even more liquid from the can, than could be accomplished by just allowing the liquid to drain from the can while it was being held upside down.

It is at this juncture in the above-described manual procedure for removing the liquid medium from canned foodstuffs that two hazards arise. The first hazard involves injury to the person carrying out the procedure, caused by the sharp and jagged edges of the cut can lid. Cuts to the hands, especially the fingers, are not uncommon, and can often be severe. The second hazard involves injury to the sensibilities, in particular, sensitiveness or susceptibility to painful olfactory sensations. Seafood in particular, e.g., tunafish, has a persistent and offensive odor, probably due to the presence of endogenous oils in the organs and flesh of these creatures, which cannot be entirely eliminated in the canning process. Most persons find these odors very disagreeable and very difficult to remove altogether from the skin. These hazards are further exacerbated by the need to apply considerable amount of compressive three to the can lid in order to squeeze out most the liquid medium present in the can. This is particularly necessary for tunafish, since any remaining oil or water will communicate the disagreeable taste and smell which they carry to the solid tunafish remaining, which will then be transferred to whatever foods are prepared therefrom.

Accordingly, it is an object of the present invention to provide a device for eliminating all of the problems associated with separating the liquid medium from the solid contents of canned foodstuffs, especially seafood, and more especially tunafish. In particular, it is an object of the present invention to provide such a device which allows the person operating it to apply sufficient compressive force on the can lid to express therefrom very substantial amounts of said liquid, while avoiding the necessity of touching any part of the can or lid.

BRIEF DESCRIPTION OF THE PRIOR ART

U.S. Pat. No. 4,355,574 to Bond discloses a liquid-expressing tong-like implement for removing liquid from a can of food product, characterized by loop-shaped jaw formations, one of which has a flat platen pivotally coupled to a rod-like leg portion, while the other defines a flat portion which engages the bottom of the can. The flat platen fits into the opened food product can to exert pressing forces onto the solid food product. The handles terminate in loops to permit operation of the device by the fingers, unlike the handles of the present invention. Although superficially similar to the implement of the present invention, the implement disclosed by Bond lacks a number of the key features and advantages of the implement of the present invention.

U.S. Pat. No. 5,396,838 to Casapulla discloses a can liquid extractor comprising a can support base having engaging elements which retain the can and lid in place, an inverting apparatus to invert the can and lid while thus held in place, and a compression apparatus comprising a handle, pivotable compression ann, and a ram assembly for exerting force on the lid. The device in Casapulla is designed and more suitable for heavy, commercial use than the implement of the present invention, and is not hand-held, as is the latter.

U.S. Pat. No. 4,860,647 to Kerslake discloses a can draining implement comprising two handles pivotally attached together, wherein one handle has a can supporting plate which faces a plunger on the other handle. The plunger has an angled face to force the liquid being drained to flow to one side, and is magnetized. The implement disclosed by Kerslake lacks a number of the key features and advantages of the implement of the present invention.

U.S. Pat. No. 3,995,544 to Farley discloses a tuna squeezer and strainer utensil comprising a cup-shaped member having a cylindrical wall conforming to the internal diameter of a standard can size, and an end which is perforated to permit the liquid being drained to be removed while the solid foodstuff remains behind. The sidewalls have tab means on the outside for grasping the strainer utensil and compressing it against the foodstuff contents on the inside of the can. The mode of action of this utensil is much different from that of the implement of the present invention; and it is very unlikely that the utensil of Farley could be used without getting a portion of tile liquid medium on the hands of tile person using it.

U.S. Pat. No. 5,335,591 to Pozar discloses a tea bag squeezer comprising a pair of flat, opposed perforated plates in connection with a pair of pivotally mounted arms that pivot the plates together. The handles terminate in loops to permit operation of the device by the fingers, unlike the handles of the present invention. While the squeezer device of Pozar has in common with the implement of the present invention the use of pivotally mounted levers which both have functional plates, the purpose of the Pozar device is quite different from that of the present invention, and there are as a consequence, a number of significant differences between the devices.

U.S. Pat. No. 5,272,968 to Keville and Murphy discloses a can drainer comprising a base with a grip and pass through hole containing a spring in which a T-shaped handle passes through when compressed, causing a magnetic plate to place pressure on a lid of an opened can. This device has features in common with the above-described device of Farley. However, with the Keville and Murphy device, as with the Farley device, the mode of action of this utensil is much different from that of the present invention; and it is very unlikely that the device of Keville and Murphy could be used without getting a portion of the liquid medium on the hands of the person using it.

SUMMARY OF THE INVENTION

Figure 1:
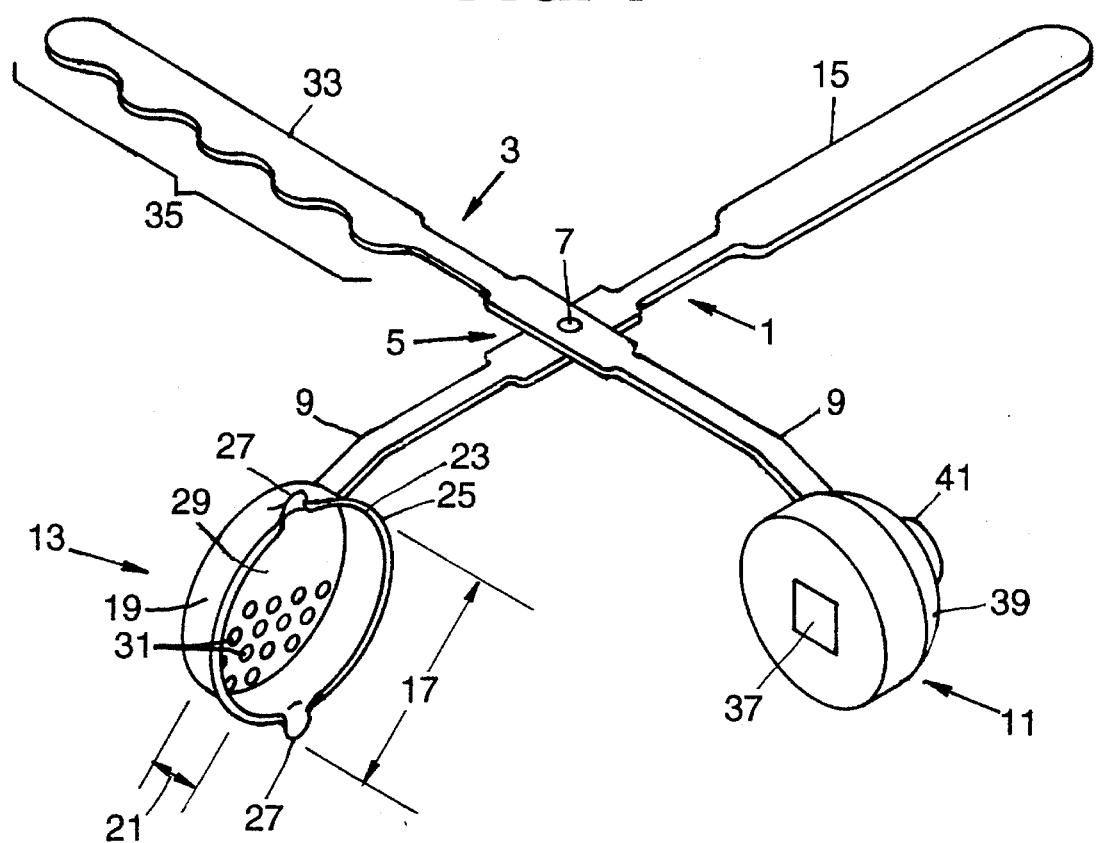
FIG. 1 is a side perspective view of an implement for separating the liquid medium from the solid contents of canned foodstuffs.

The present invention relates to an implement for separating the liquid medium from the solid contents of canned foodstuffs comprising a first arm and a second arm pivotally connected together at a hinge member; said first arm terminating at a first end thereof in a handle means, and terminating at a second end thereof in a can receptacle means; said second arm terminating at a first end thereof in handle means, said handle means of said first and second arms thus being formed into oppositely extending, cooperating handle means, and said second arm terminating at a second end thereof in a compression plate, substantially alignable with said can receptacle means, having a periphery sized to permit insertion into said can containing a solid foodstuff in a liquid medium, the lid of which has been opened by separation from said can, said periphery also being sized to permit said liquid to escape from said can around said plate when said plate applies a compressive force on said solid contents by actuation of said cooperating handle means, and the thickness of said plate also being sized so that a portion thereof protrudes from the top of said can after insertion of said plate and compression of said solid contents of said can is completed, whereby said protruding portion of said plate may be used to strike a solid surface, converting and communicating the force thus generated into a further compressive force on said solid contents of said can in order to separate additional amounts of said liquid.

The present invention further relates to an implement for separating the liquid medium from the solid contents of canned foodstuffs of the type described above wherein said handle means on said first arm comprises substantially wide and flat handle means adapted to fit the palm of the hand of a person using said implement; said handle means on said second arm comprises handle means adapted to accommodate the fingers of the hand of a person using said implement; said hinge member comprises a pivot pin whereby said first and second arms are pivotally connected to one another; ratchet means are additionally included whereby, when said oppositely extending, cooperating handle means are actuated so as to apply compressive force to said solid contents of said can, said handle means are maintained in their most recent position; said can receptacle means comprises a cylinder closed at one end, whose periphery is sized to receive said can and, together with its height, are sized to prevent significant movement of said can while said compressive forces are being applied thereto, and the top edge of the open end of said cylinder is formed into two spouts on opposite sides thereof, in a line perpendicular to the main axis of said first and second arms; and said compression plate is sufficiently large, or made from a dense material, or weighted, or any combination of these; so as to be sufficiently heavy as to increase the additional compressive force created by said compression plate when it is struck against a solid surface, is magnetized or has inserted in a recess therein a permanent magnet, the protruding portion thereof is rounded and has an elastomeric member attached thereto or inserted therein to prevent damage to said solid surface which it strikes.

DETAILED DESCRIPTION OF THE INVENTION

In FIG. 1 the implement of the present invention for separating the liquid medium from the solid contents of canned foodstuffs is seen to include a first arm 1 and a second arm 3, which are pivotally connected together by hinge member 5. Here, the hinge member is shown as a simple pivot pin 7; however, other embodiments of the hinge member would be suitable. For example, a machine screw and compression nut, preferably with a nylon sleeve, could be used. The arms themselves should be fabricated from very strong materials, e.g., stainless steels, because of the substantial forces which they exert, and which are exerted on them, as detailed further below. The dimensions and shape of the arms are also dictated by their function, e.g., the requirement of strength means that a certain degree of thickness is needed. The length will be readily arrived at by a consideration of the overall weight involved and the need to keep the end where the liquid is being separated a reasonable distance from the person using the implement, in order to avoid having the liquid splashed on that person. As for shape of the arms, they cannot be simply straight, since that would not permit the compression plate 11 and can receptacle 13 to be aligned. Consequently, at least one, but preferably both arms are bent to an angle 9 which permits the compression plate and can receptacle to be substantially aligned with each other. The angled arms also have the advantage of giving the implement of the present invention a slim profile which is not only aesthetically pleasing, but which permits easy storage as well.

The first arm 1 terminates at a first end thereof in a substantially wide and flat handle means 15 adapted to fit the palm of the hand of a person using the implement of the present invention. The purpose of the substantially wide and flat handle is to spread the force which must be applied through the handle, across most of the palm of the hand of the person operating the implement. This handle shape prevents discomfort and any tendency of the hand to slip from off the handle when considerable force is being applied. For the same reasons, it also permits the application of greater pressure through the handle than would otherwise be the case.

The first arm 1 terminates at the end opposite the handle in a can receptacle means 13. There is no particular requirement for the construction and configuration of the can receptacle means, except that it be capable of holding the can easily yet securely while the compression plate is applying force against the solid contents of the can, thereby separating the liquid medium from the canned foodstuffs. However, it is preferred that it be made from the same material as the arm to which it is attached, or of which it forms a part, e.g., stainless steel. It is also preferred that the can receptacle means comprise a cylinder closed at one end, whose periphery is sized to receive the can. Thus, the inside diameter 17 of the cylinder will be slightly larger than the outside diameter of the standard foodstuff can on which the implement of the present invention is to be used. It is not required that the wall 19 of the cylinder be as high as the can. In fact, the action and dimensions of the other arm 3 and the compression plate 11 at its end, which interacts with the can receptacle means 13, must be taken into consideration. For example, the height 21 of the wall 19 of the can receptacle 13 will place a constraint on the depth to which the compression plate 11 can be inserted into the can, because the arm 3 will tend to make early contact with wall 19. Thus, the effectiveness of the implement will be limited unless, e.g., the arm 3 at or near the angle 9 or the point of its attachment (not shown) to the compression plate 11, is reconfigured so as to avoid premature contact with the wall 19. Of course, the height 21 of the wall 19 can also be reduced. It is only necessary that the ultimate height 21, together with the diameter 17 of the can receptacle 13, be sized to prevent significant movement of the can while compressive forces are being applied to it by the compression plate 11.

It is further preferred, for safety reasons, that the top edge 23 of the open end of the cylinder be formed with a flange or lip 25 so as to avoid sharp edges. It is still further preferred that the top edge 23 and necessary portions of the wall 19 also be formed so as to provide two spouts 27 on opposite sides of the cylinder top edge 23, in a line perpendicular to the main axis of the first arm 1. This arrangement of the spouts permits the user of the implement to pour out the separated liquid medium which will have moved from the can to the bottom of the can receptacle means 13, whether that user is right-handed or left-handed. It is contemplated that in use, the implement of the present invention, once the opened can of foodstuffs is held securely by the arms 1 and 3, and the can receptacle means 13 and compression plate 11 at their respective ends, will be inverted to pour the separated liquid directly into a place of disposal, and/or the implement and can thus held will be placed in an upright position, under running tap water to remove or further remove the liquid medium. In any of these contemplated ways of using the implement of the present invention, there will be a strong tendency for the separated liquid medium, or a portion of it, to end up in the bottom of the can receptacle 13. Thus, in another preferred embodiment of the present invention, the closed end or bottom 29 be perforated, as partially illustrated at 31.

The second arm 3 of the implement of the present invention terminates at a first end thereof in a handle means 33, adapted to accommodate the fingers of the hand of a person using said implement, as illustrated at 35. As with the handle means 15 on an end of the first arm, this handle shape in the form of a finger grip 33, prevents discomfort and any tendency of the hand to slip from off the handle when considerable force is being applied. For the same reasons, it also permits the application of greater pressure through the handle 33 to the compression plate 11, than would otherwise be the case. While it is contemplated that the handle means 15 and 33 can be made of the same material as the arms 1 and 3, or actually be formed directly as an integral part of those arms, a further embodiment of the present invention includes an implement in which the handle means are made from a different material from that of which the arms are made, or in which the handle means are covered with such a different material, even though they are made of the same material as the arms. The purpose of this different material for the handle means will be readily apparent. Where the arms are made of a structurally strong materials such as stainless steel, a problem is created by the tendency of the surface of the stainless steel or similar surface to be slippery when wet, which will occur when the use of the implement of the present invention is aided by running water. Such different materials are suitably synthetic resins and elastomers of various types which offer a secure grip even when wet, and which have other necessary qualities such as resistance to abrasion, heat and cold, and caustic chemicals. A variety of resins having the desired qualities are well known to the artisan and are commercially available. Whatever materials they may be made from, the handle means 15 and 33 of the first and second arms, 1 and 3, respectively, are formed into oppositely extending, cooperating handle means, and together with the arms, operate in the manner of tongs.

The second arm 3 terminates at a second end thereof in a compression plate 11, which is alignable with the can receptacle means 13. The term "substantially alignable" as used herein is intended to mean of a kind to, disposed to, or capable of being in, or coming into substantially precise adjustment or substantially correct relative position, with respect to the can receptacle means 13. All that is required is that arms 1 and 3, and compression plate 11 and can receptacle means 13, be so configured that when the implement is operated so as to move compression plate 11 toward the can of foodstuffs being held by can receptacle means 13, sufficient alignment is achieved for the compression plate 11 to be inserted into the can to a sufficient depth that the compressive force which it applies to the solid contents of the can will separate all or most of the liquid medium from it. Compression plate 11 thus has a periphery sized to permit insertion into the can containing a solid foodstuff in a liquid medium. It is contemplated that during normal operation of the implement of tile present invention, that the lid of the can of foodstuffs will have been opened by separation from the can, e.g., by an ordinary can opener, usually driven by an electric motor. As already discussed, such ordinary can openers, in accordance with the method by which they operate to perforate and cut the steel lid of the can, invariably leave many sharp points and edges. In accordance with the present invention, this lid is merely left in place, thus avoiding the danger of contact therewith. The periphery of compression plate 11 must also be sized to permit the liquid medium to freely and easily escape from the can around the compression plate 11 when it applies a compressive force to the solid contents of the can of foodstuffs. Since the lid of the can is still in place, although separated, it is only necessary that the periphery of the compression plate 11 be slightly smaller than that of the lid.

The thickness of the compression plate 11 must also be sized so that a portion thereof protrudes from the top of the can after insertion of the compression plate 11 and compression of the solid contents of the can is completed. The protruding portion (not shown) of the compression plate 11 may be used in the same manner as a hammer to strike a solid surface, converting and communicating the force which is thus generated into a further compressive force on the solid contents of the can in order to separate additional amounts of the liquid medium. This function is further facilitated if the compression plate 11 is sufficiently large, or made from a dense material, or weighted, or any combination of these, so as to be sufficiently heavy to increase the additional compressive force created when the compression plate 11 strikes a solid surface. In a further embodiment, the protruding portion of the compression plate 11 is rounded, thus facilitating is use in striking a solid surface; and the protruding portion has an elastomeric member attached thereto or inserted therein so as to prevent any damage to the solid surface when it is struck. In a still further embodiment, the compression plate 11 is magnetized, or has inserted in a recess therein a permanent magnet 37. This magnet will attract and hold to the face of the compression plate 11, the steel lid of the can of foodstuffs. When the operation of the implement of the present invention has separated all or most of the liquid medium from the solid contents of the can of foodstuffs, the arms 1 and 3, and handles 15 and 33 are moved in the opposite direction, so that the compression plate 11 is withdrawn from its position inside the can of foodstuffs. When it is thus withdrawn, the steel lid of the can will still be attached to the face of the compression plate 11 and will be withdrawn with it. The particular construction of the compression plate 11 which makes it suitable for striking a solid surface, now serves an additional function. By striking the implement of the present invention against the side of a disposal container, using the protruding portion of the compression plate 11 for striking, the steel lid can be removed without it being necessary to touch it, thus avoiding the risks created by the sharp points and edges of the lid, to which the user would otherwise be exposed.

Figure 2:
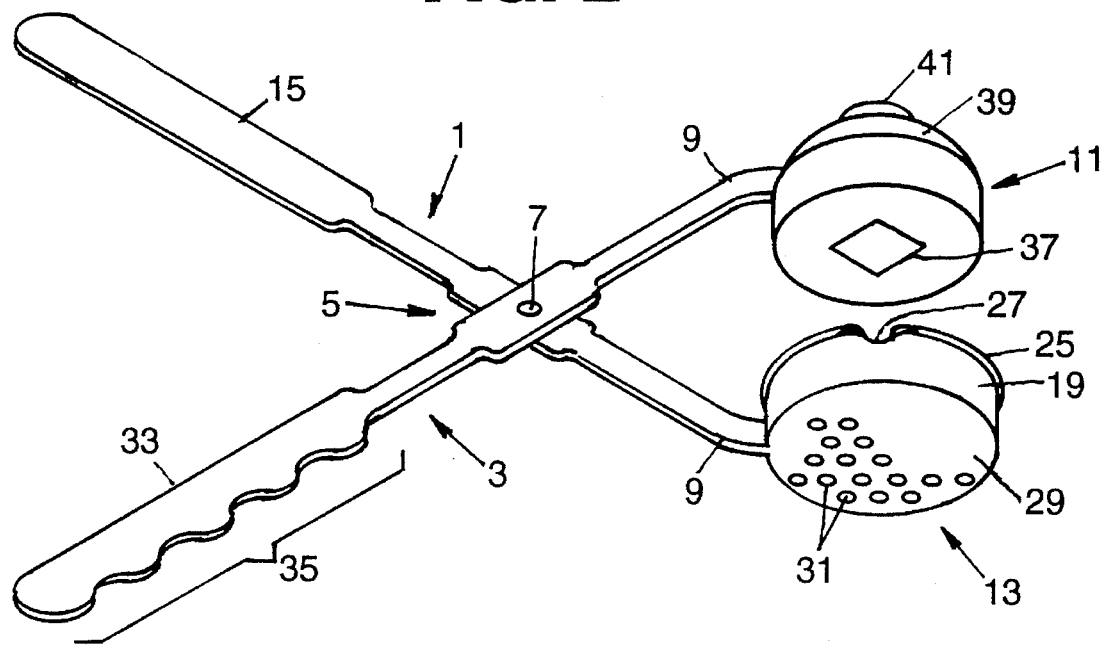
FIG. 2 is a front perspective view of an implement for separating the liquid medium from the solid contents of canned foodstuffs.

FIG. 2 presents a slightly different view of an embodiment of the implement of the present invention, showing arms 1 and 3 pivotally connected by hinge member 5 comprising a pivot pin 7, with handle means 15 and 33, the latter having finger grips 35. The compression plate 11 with inserted magnet 37, and the can receptacle means 13 with one of two spouts 27 in the wall 19, are also shown.

Figure 3:
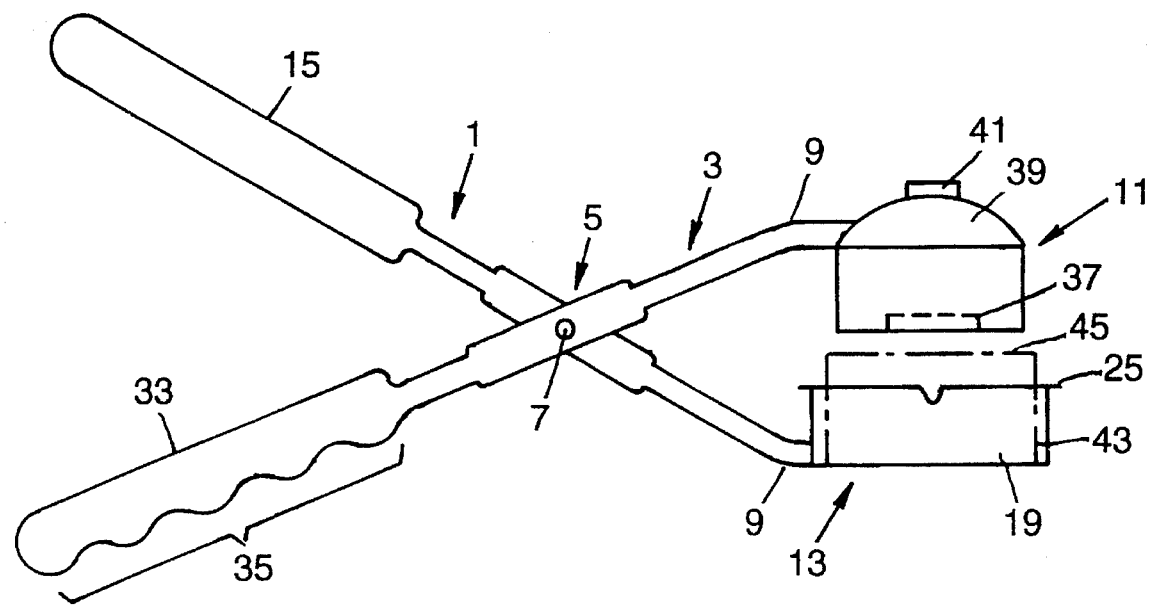
FIG. 3 is a plan view of an implement for separating the liquid medium from the solid contents of canned foodstuffs.

FIG. 3 is a plan view of an embodiment of the implement of the present invention which, in addition to showing arms 1 and 3 pivotally connected by hinge member 5 comprising a pivot pin 7, with handle means 15 and 33, the latter having finger grips 35, compression plate 11 with inserted magnet 37, and can receptacle means 13 with wall 19 partially broken away, shows the protruding portion of compression plate 11 which is rounded 39 and has an elastomeric member 41 inserted therein, and the can of foodstuffs 43 being held in the can receptacle means 13, and the lid 45 of the can 43 beneath the magnet 37 to which it will become attached. This view also shows the required sizing of the various components of the implement of the present invention. The periphery of the can receptacle means 13 is sized to accommodate the can 43, while the periphery of the compression plate 11 is sized so as to allow its placement against and attachment to the lid 45, followed by insertion into the can 43, where it exerts compressive force against the solid contents of the can 43 in order to separate the liquid medium therefrom.

The implement of the present invention is useful for draining the liquid medium from the solid or semi-solid contents of canned foodstuffs, and will prove of great benefit around the common household. However, it will prove of equally great benefit in a commercial setting, e.g., in a restaurant or cafeteria kitchen, where the need for the implement will also arise. It will be appreciated, moreover, that in such a commercial environment, somewhat different use requirements must be taken into account, especially in light of the larger quantities of foodstuffs which prevail, and the correspondingly larger containers, including cans, in which they are stored. The implement of the present invention, constructed with this end use in mind, will be larger, heavier, and stronger than the implement of the present invention constructed for common household use. It will be fabricated from tougher and more durable materials, and will be able to withstand the greater amount of abuse to which it will be subjected; and it will have dimensions which, overall, are greater than those of its household counterpart, so that it will be able to accommodate the larger cans typically present in the commercial establishment. Other modifications of the implement of the present invention to better suit it to use in a commercial kitchen environment will readily suggest themselves to the artisan.

What is claimed is:

1. An implement for separating the liquid medium from the solid contents of canned foodstuffs comprising:

a first arm and a second arm pivotally connected together at a hinge member;

said first arm terminating at a first end thereof in a handle means, and terminating at a second end thereof in a can receptacle means;

said second arm terminating at a first end thereof in a handle means;

wherein said handle means of said first and second arms are formed into oppositely extending, cooperating handle means;

said second arm terminating at a second end thereof in a compression plate, substantially alignable with said can receptacle means;

having a periphery sized to permit insertion into said can containing a solid foodstuff in a liquid medium, the lid of which has been opened by separation from said can;

said periphery also being sized to permit said liquid to escape from said can around said plate when said plate applies a compressive force on said solid contents by actuation of said cooperating handle means;

the thickness of said plate also being sized so that a portion thereof protrudes from the top of said can after insertion of said plate and compression of said solid contents of said can is completed, whereby said protruding portion of said plate may be used to strike a solid surface, converting and communicating the force thus generated into a further compressive force on said solid contents of said can in order to separate additional amounts of said liquid medium.

2. An implement according to claim 1 wherein said handle means on said first arm comprises substantially wide and flat handle means adapted to fit the palm of the hand of a person using said implement.

3. An implement according to claim 1 wherein said handle means on said second arm comprises handle means adapted to accommodate the fingers of the hand of a person using said implement.

4. An implement according to claim 1 wherein said hinge member comprises a pivot pin whereby said first and second arms are pivotally connected to one another.

5. An implement according to claim 1 wherein ratchet means are additionally included whereby, when said oppositely extending, cooperating handle means are actuated so as to apply compressive force to said solid contents of said can, said handle means are maintained in their most recent position.

6. An implement according to claim 1 wherein said can receptacle means comprises a cylinder closed at one end, the periphery of which is sized to receive said can and, together with its height, are sized to prevent significant movement of said can while said compressive forces are being applied thereto.

7. An implement according to claim 6 wherein the top edge of the open end of said cylinder is formed into two spouts on opposite sides thereof, in a line perpendicular to the main axis of said first and second arms.

8. An implement according to claim 7 wherein said top edge is formed into a flange and said closed end of said cylinder is perforated.

9. An implement according to claim 1 wherein said compression plate is sufficiently large, or made from a dense material, or weighted, or any combination of these, so as to be sufficiently heavy as to increase the additional compressive force created by said compression plate when it is struck against a solid surface.

10. An implement according to claim 9 wherein said compression plate is magnetized or has inserted in a recess therein a permanent magnet.

11. An implement according to claim 10 wherein the protruding portion of said compression plate is rounded and has an elastomeric member attached thereto or inserted therein in order to prevent damage to said solid surface which said protruding portion of said compression plate strikes.

* * * * *